Aug. 2, 1927.
H. E. PORTER
1,637,708
MACHINE FOR THE MANUFACTURE OF CRUCIBLES AND THE LIKE
Filed March 25, 1924     4 Sheets-Sheet 1.
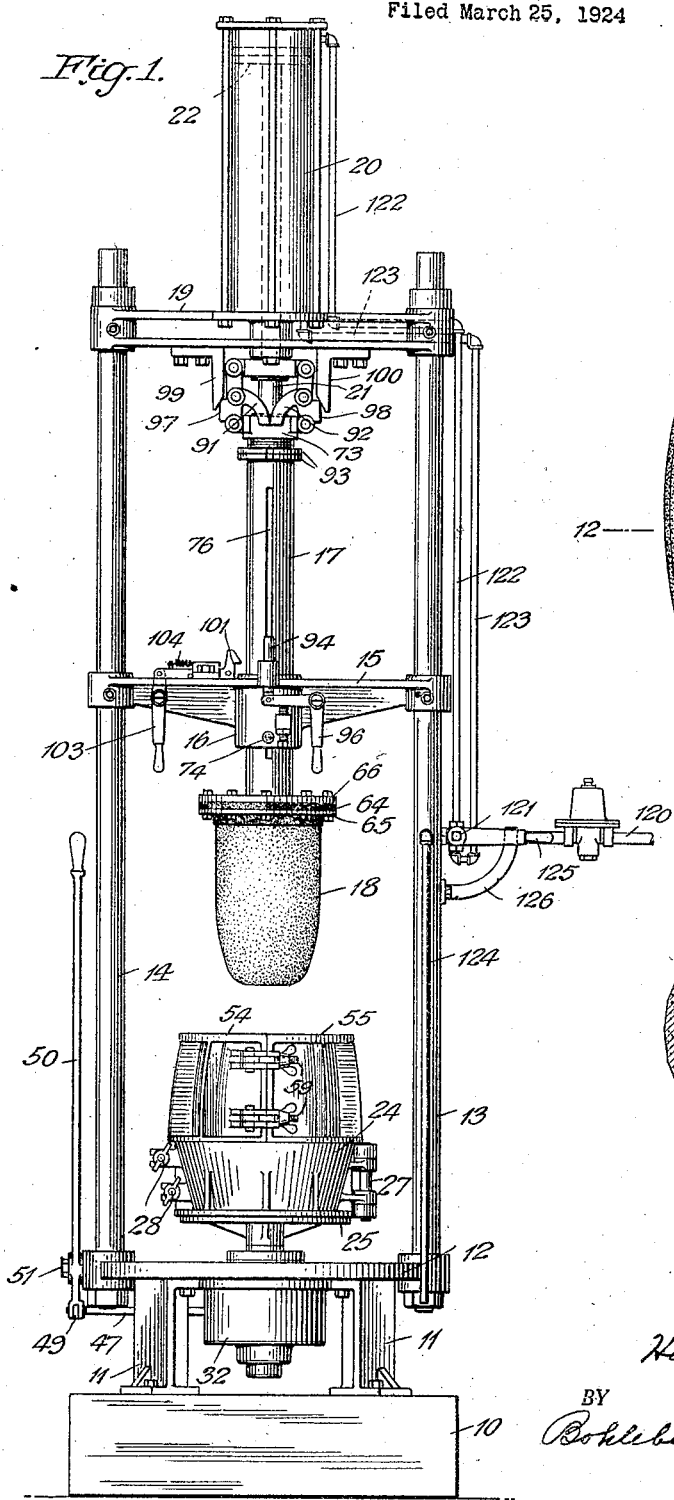
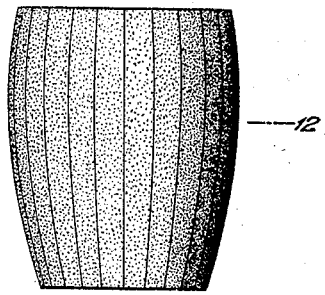
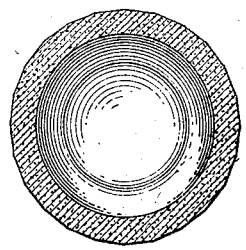
INVENTOR.
Harold E. Porter
BY
Bohleber & Ledbetter
ATTORNEYS

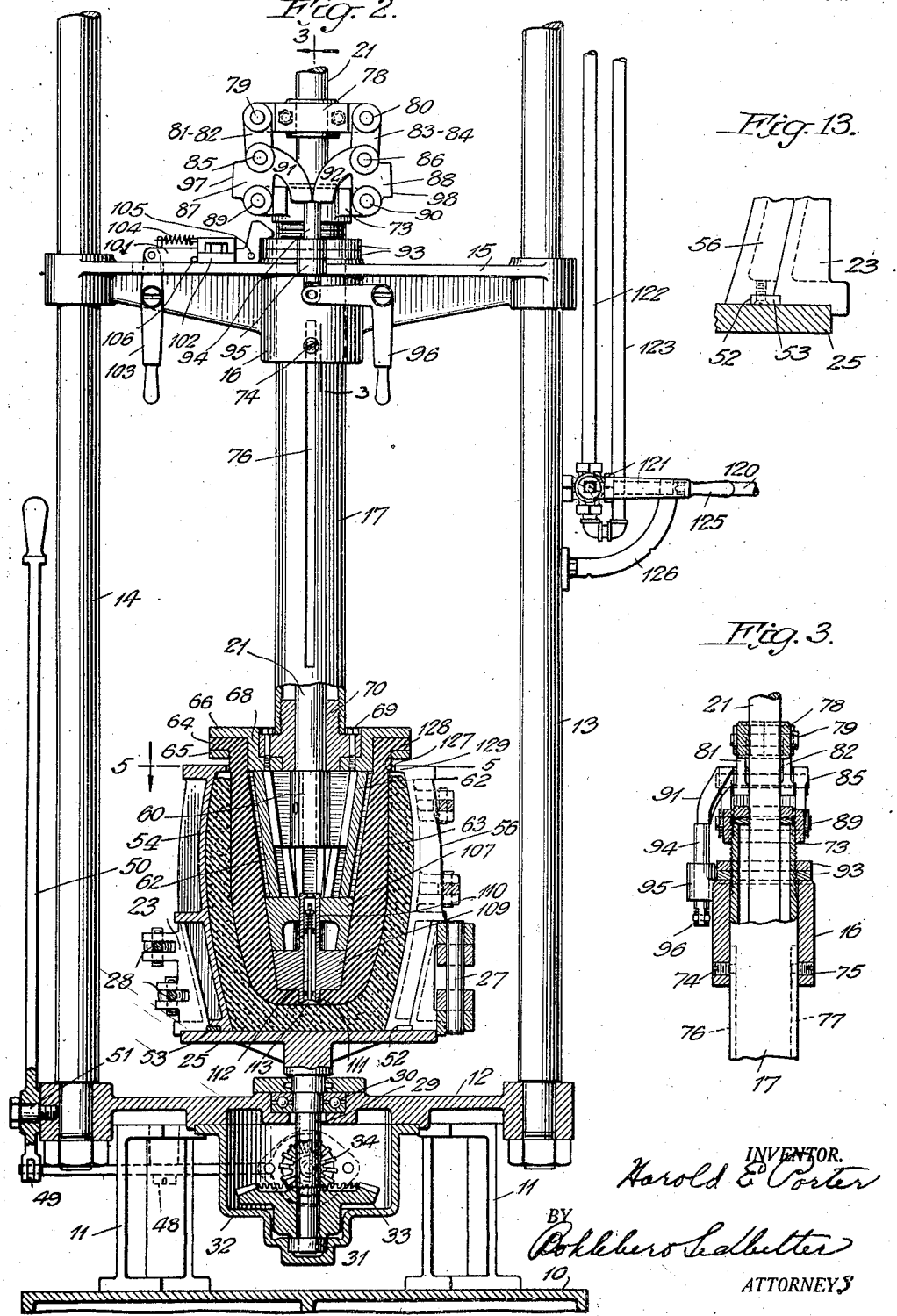

Aug. 2, 1927.  
H. E. PORTER  
1,637,708  
MACHINE FOR THE MANUFACTURE OF CRUCIBLES AND THE LIKE  
Filed March 25, 1924  
4 Sheets-Sheet 3

INVENTOR.  
Harold E. Porter  
BY  
ATTORNEYS

Aug. 2, 1927.  
H. E. PORTER  
1,637,708  
MACHINE FOR THE MANUFACTURE OF CRUCIBLES AND THE LIKE  
Filed March 25, 1924  
4 Sheets-Sheet 4
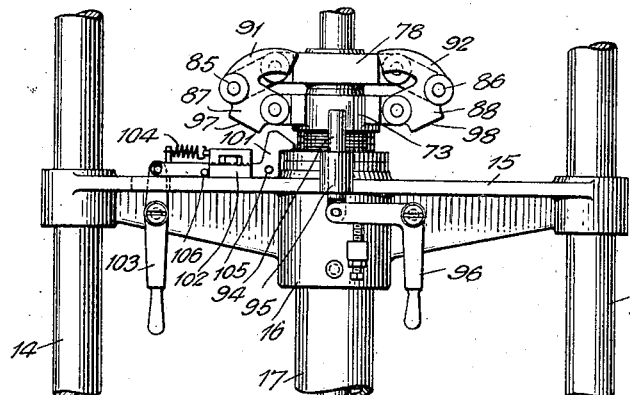
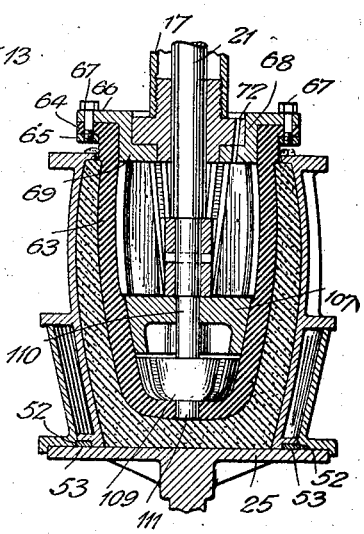
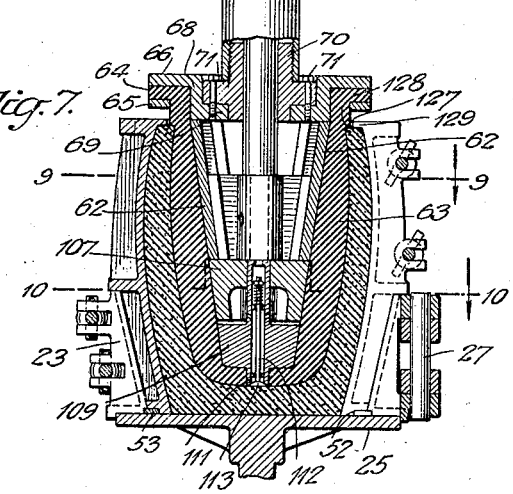
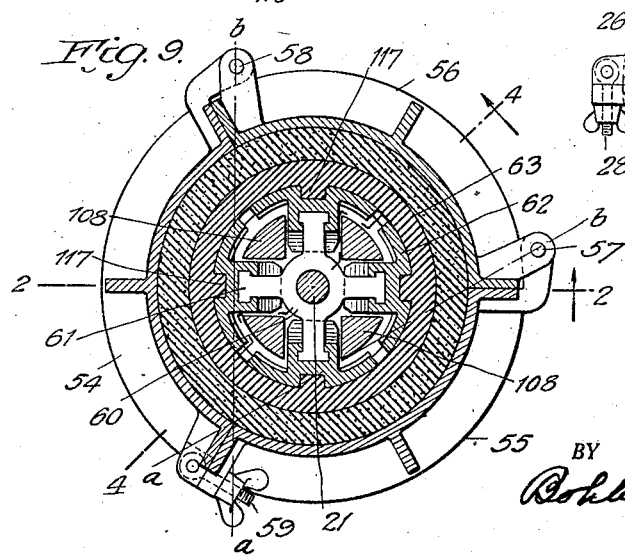
INVENTOR.
Harold E. Porter
BY
ATTORNEY.

Patented Aug. 2, 1927.

1,637,708

UNITED STATES PATENT OFFICE.

HAROLD E. PORTER, OF BAYSIDE, NEW YORK, ASSIGNOR TO CHARLOTTE T. PORTER.

MACHINE FOR THE MANUFACTURE OF CRUCIBLES AND THE LIKE.

Application filed March 25, 1924. Serial No. 701,664.

The present invention relates to a machine for the manufacture of crucibles, particularly crucibles made from plastic material or substances, although useful generally in this and kindred arts.

Heretofore crucibles from plastic material have been made by turning a mass of the plastic material on a potter's wheel or the like either with or without the use of a mold for forming the outside and using the hand or a forming tool for shaping the inside. The most rapid method is that employing a machine for spinning a mold into which is placed a sufficient quantity of crucible material and moving a forming tool down into the center of said mass as far as the inside of the bottom of the finished crucible and then horizontally to spread the plastic material against the side of the mold.

By my invention I am able to save considerable time in the molding of a crucible and further save time in the firing or baking of the crucible as much less plastic material can be used with my method and apparatus. Furthermore a superior article is produced. In my machine I employ an expansible punch within a mold to form plastic material in said mold to the shape of the interior of the mold and the exterior of the expanded punch in a short and rapid operation.

It is therefore an object of my invention to provide a forming machine for crucibles and the like which employs a mold and a plug or punch therein which has a length substantially equal to the depth of the finished crucible and which, after entering the mold to partially form the crucible, is expansible radially substantially throughout its length while in said mold for the purpose of spreading and compacting the plastic material against all sides or portions of the mold. After the crucible has been formed in the manner just stated the punch is collapsed thereby enabling it to be readily withdrawn from the mold without injury to the crucible molded. As the punch enters the mold and also during the lateral expansion of said punch the mold is constantly rotated being mounted, as it is, in a suitable rotating chuck. This not only serves to compact the material and fill up the voids but also effects a vertical and horizontal arrangement of the grain of the plastic material to give it maximum strength, so much so that the crucible when so formed may be immediately removed from the mold without danger of collapsing.

Further objects, features, and advantages will more fully appear from the description below taken in connection with the accompanying drawings which form part of this application and in which:

Fig. 1 shows a front elevation of one embodiment of my invention, the machine being in the normal position with the punch at its upper limit of movement.

Fig. 2 is an enlarged view of parts illustrated in Fig. 1 with certain portions thereof shown in vertical section, with the parts located in different relative positions, and with the punch at its lower limit of movement but with the jaws thereof still in their collapsed position.

Fig. 3 is a detailed cross-sectional view taken on the line 3—3 in Fig. 2.

Fig. 7 is a view similar to that illustrated in Fig. 2 showing the final operation of the machine, that is, with the jaws of the punch expanded to effect the final compression of the plastic material in the mold.

Fig. 8 is the section of the mold and its parts in the position illustrated in Fig. 7 but with these parts together with the mold rotated through a slight angular distance. The section is taken substantially on the line 4—4 on Fig. 9.

Fig. 9 is a section taken on the line 9—9 of Fig. 7.

Fig. 10 is a section taken on the line 10—10 of Fig. 7.

Fig. 11 is a perspective view of the crucible after it is taken from the mold.

Fig. 12 is a horizontal section of the crucible taken on the line 12—12 of Fig. 11.
Fig. 13 is a detail.

Figure 4:
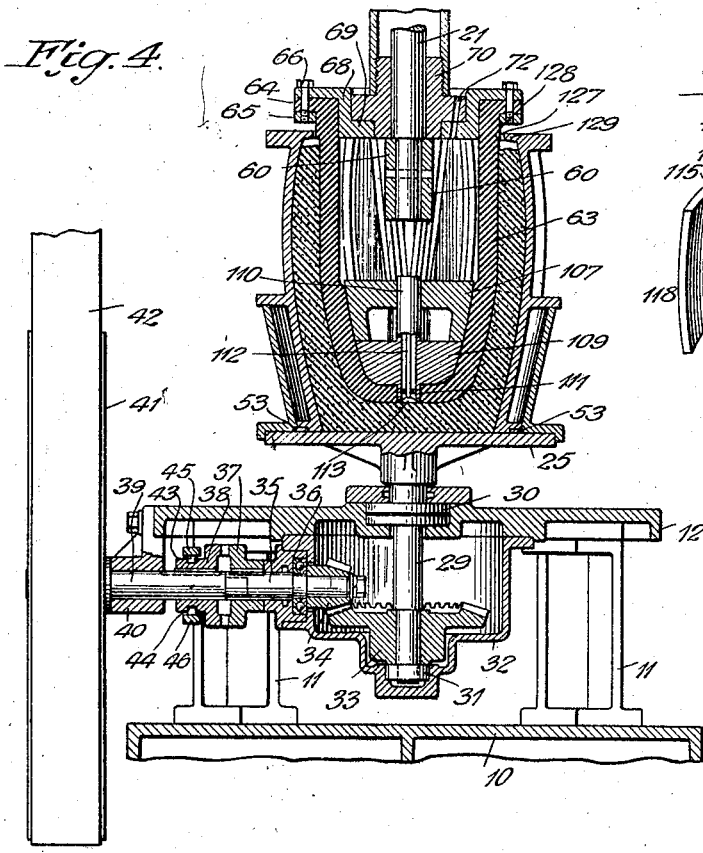
Fig. 4 is a section of a part of the machine of Fig. 1 taken at right angles to the section shown in Fig. 2 and along the line 4—4 of Fig. 9. In this view the mold has been slightly turned from the position of Fig. 2, but the jaws of the punch have not been expanded as they are in Fig. 9.

Referring to the drawings in detail the reference numeral 10 designates a foundation made of any suitable material upon which the machine is supported. Projecting upwardly from the foundation are a plurality of standards 11 for supporting the base plate 12 of the machine. Secured to and extending upwardly from the base-plate 12 are two stanchions or uprights 13 and 14. Mounted upon these stanchions at an intermediate position is a guide frame 15 which carries a bearing or boss 16 which guides a supporting sleeve 17 for the punch 18 in its upward and downward movement. Located adjacent to the upper ends of and supported by the stanchions 13 and 14 is a second guide frame 19 which supports a pneumatic cylinder 20 and also serves as a bearing for the piston rod 21 which is connected to a piston 22 operating in said cylinder 20 to effect the upward and downward movement of the punch 18.

The reference numerals 23 and 24 designate the two sections of a suitable chuck, the section 23 being secured to the revolving table 25 as by bolts 26, (see also Fig. 10). The two sections are relatively movable; that is to say the section 24 is pivoted to the section 23 about the pintle 27 as a center. The two sections are clamped to each other by means of swivel bolts 28 as will be more clearly apparent from an inspection of Figs. 2, 7 and 10. The chuck 23—24, as before stated, is suitably secured to and rotatable with and by the revolving table 25. This table is equipped with and supported by a shaft 29, which is provided with bearings 30 and 31 (see Fig. 2), one of which is located in the base-plate 12 and the other of which is located in the bottom of the housing 32. Upon the lower end of the shaft is fixed a bevel gear 33 which meshes with a bevel pinion 34 mounted upon a stub shaft 35 (see Fig. 4) rotatably mounted in a suitable bearing 36 located in the housing 32. Upon this shaft 35 is also secured one member 37 of a clutch, the other member 38 of which is rotatably fixed to but longitudinally movable upon a co-axial countershaft 39 rotatably mounted in a suitable bearing 40 (see Fig. 4) supported by the base-plate 12. Upon the outer end of this countershaft 39 is mounted a driving pulley 41 driven by a belt 42. The clutch member 38 is movable longitudinally upon the shaft 39 by the following mechanism. This clutch member 38 is provided with a suitable annular groove into which the pins 43 and 44 project from the forked arms 45 and 46 of the lever 47. This lever is pivoted at an intermediate point 48 to swing about the same as an axis. The outer end of this lever 47 is pivotally connected to one end of the link 49, the other end of the link being pivoted to the lower end of the operating lever 50 pivoted at 51 to the base-plate 12 of the machine. It will therefore be seen, as the lever 50 is moved backwards and forwards about its pivotal point 51 as a center, that the clutch member 38 will be thrown into and out of engagement with the clutch member 37 and that when said clutch members are engaged with each other a movement is imparted to the shaft 35 and a corresponding movement is imparted to the shaft 29 through gears 33 and 34 to rotate the table 25 and hence the chuck 23—24. The downward thrust of the revolving table 25 during the punching operation, is taken up by the thrust bearing 30.

Figure 5:
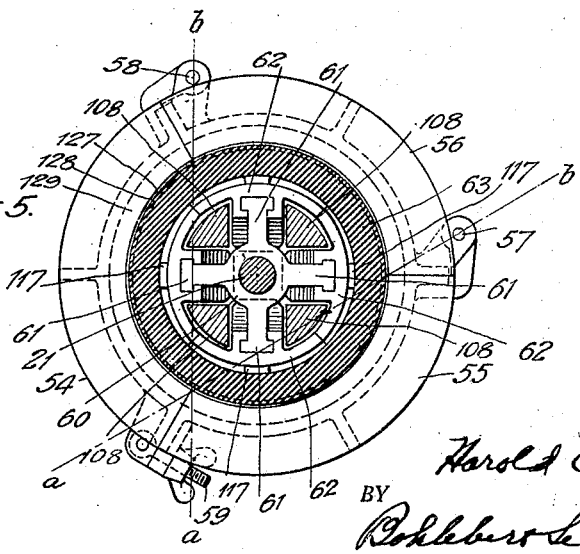
Fig. 5 is a section taken on the line 5—5 of Fig. 2.

The chuck 23—24 is provided at its lower end with an undercut groove 52 for the purpose of receiving correspondingly shaped annular steel flanges 53 located at and extending laterally from the bottom of the mold sections 54, 55 and 56 (see Fig. 5). The mold is preferably made of said three sections 54, 55 and 56 so as to enable the molded article to be readily removed therefrom after the punching or rather molding operation has been completed. The sections of the mold are preferably made of aluminium; hence the desirability of making the flanges 53 of steel. The mold sections are provided with vertical ribs which are engaged by the chuck sections. The mold sections are preferably secured to one another in an assembled position by mean of hinges 57 and 58 at two joints and the swivel bolts 59 at the other, all of which is clearly illustrated in Fig. 5. It will therefore be seen that when the mold sections are assembled to one another the mold is inserted in the chuck with the flange 53 engaging the groove 52 of the said chuck in consequence of which when the chuck sections 23 and 24 are tightened to each other by means of the swivel bolts 28 an upward movement of the mold is prevented. This is important particularly in the withdrawal of the punch after the punching operation has been completed.

Figure 6:
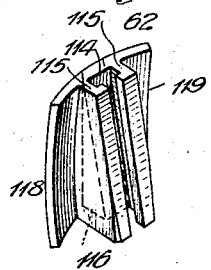
Fig. 6 shows a detailed perspective view of one of a set of expanding jaws which operate within the punch.

The punch mechanism comprises the following: The cylinder 20 is equipped with a piston 22 (see Fig. 1) located upon the upper end of the shaft or piston rod 21. This shaft 21 passes through a sleeve 17 and is provided at its lower end with an expanding member or spider 60 fixed thereto and having a plurality of laterally extending T-shaped tapered expanding arms 61 which serve to engage with the jaws 62 (see Figs. 5 and 6). The spider 60, the arms 61 thereon and the jaws 62 are located within a flexible expansible punch member 63, the latter being provided at its upper end with a flanged portion 64 which is located between an annular ring 65 and a member 66. The flange 64 of the punch member 63 is clamped to and secured to the ring 65 and the member 66 by means of suitable bolts 67 clearly illustrated in Fig. 8. The member 66 is also equipped with a depressed portion 68, telescoping within the punch member 63. Extending inwardly from the depressed portion 68 is a flanged portion 69 upon which rests a guide 70 for the piston rod or shaft 21. The bearing member 70 is rigidly secured to the member 66—67—68 in any suitable way as by bolts 71 (see Fig. 7). An air duct 72 passes through parts 69 and 70. (See Figs. 4 and 8.) The bearing member 70 is provided with an external screw thread for receiving the internal screw threaded sleeve 17 and by which said sleeve is secured thereto. The sleeve as before stated, passes through a boss 16 on the bearing frame 15 and above said bearing frame said sleeve is connected to a member 73 longitudinally adjustable thereon by means of a screw threaded connection therewith. The sleeve 17 is prevented from rotating by means of set screws 74 and 75 (see Figs. 2 and 3) located in the boss 16 and engaging respectively into the grooves 76 and 77 of said sleeve. To the shaft 21 which passes through sleeve 17 above the member 73 is rigidly secured a strap member 78. The member 73 and the strap member 78 provide means for enabling a relative longitudinal movement of the shaft 21 and sleeve 17. This is desirable as the punching operation comprises essentially two different operations. In the first place the downward movement of the punch 18 moving as a unit with shaft 21 and sleeve 17 makes a hole into the mass of plastic material previously inserted in the mold, and in the second place a lateral expansion of the punch is effected by a continued downward movement of said shaft 21 with respect to said sleeve 17 which serves to further compress the plastic material and causes it to be spread over the entire surface of the mold. The relative movement of the shaft 21 with respect to the shaft 17 is for the purpose of effecting a radial movement of the expansible punch member 63. This relative movement is effected by means of toggle connection between the members 73 and 78 which comprises the following mechanism. Pivoted to the member 78 at the points 79 and 80 are the ends of four links 81—82 and 83—84. (See Figs. 2 and 3). The other ends of these links are pivoted at 85 and 86 to the members 87 and 88 which are in turn pivoted respectively to the members 73 at the points 89 and 90. The members 87 and 88 are provided respectively with arms 91 and 92, the normal position of which, together with the toggle mechanism, is clearly illustrated in Figs. 1 and 2. It will therefore be readily apparent that upon the downward movement of the piston 22 and shaft 21, a corresponding movement will be imparted to the sleeve 17 until the adjustable lock nuts 93 come into contact with the upper surface of the guide frame 15. It is these lock nuts which accurately predetermine the extent of the downward movement of the shaft 21, sleeve 17 and punch 16 relative to the mold. In other words, the downward movement may be increased or decreased by a corresponding adjustment of the lock nuts 93 on the threaded upper end of sleeve 17. At this point of the downward travel of the shaft 21 and the sleeve 17 the arms 91 and 92 of the toggle members 87 and 88 come into juxtaposition with the pin 94 vertically movable in a bearing sleeve 95 located upon the bearing frame 15 (see Fig. 2). The lower end of the pin 94 is pivotally connected to a manually actuating lever 96. It will, therefore, be readily apparent from Fig. 2, that upon the manual movement of the lever 96 to the left, the pin 94 will engage the arms 91 and 92 thereby breaking the toggle thus enabling a continued or a supplemental downward movement of the shaft 21 relative to the sleeve 17. This additional movement of the shaft 21 effects an expansion of the jaws 62 in a manner hereinafter more fully described, and of course, a corresponding lateral expanding movement of the rubber or other flexible member 63. This relative downward movement of the shaft 21 continues until the bearing member 78 engages with the bearing member 73, as clearly illustrated in Fig. 7.

Upon the upward movement of the shaft 21 due to reversed pneumatic action in the cylinder 20, the portions 97 and 98 of the toggle members 87 and 88 respectively engage with the cam members 99 and 100 (see Fig. 1) and assures the restoration of the toggle members as well as the shaft 21 and sleeve 17 to their relative normal positions. These members 99 and 100 are secured to the bearing frame 19. It will be readily apparent that if positive means were not provided to prevent it the sleeve 17 would quickly retreat upwardly from its lowermost position upon the breaking of the toggle. It is prevented from doing so, however, by means of the spring-pressed dog 101 which engages over the lock nuts 93 as soon as the sleeve 17 has travelled to its downward limit. This dog is mounted in a bearing 102 (see Fig. 2) fixed to the upper surface of the bearing frame 15. This is an important feature as it maintains the punch in its proper vertical position until the same has been expanded laterally to complete the molding operation. After the molding operation has been completed, that is after the punch has been collapsed, the dog is retracted by means of a movement of the manually operated lever 103 to the right as viewed in Figs. 2 and 7 against the tension of the spring 104 which holds said dog normally in the position illustrated in Figs. 1, 2 and 7. A stud 105 on the dog limits its outward movement, and the stud 106 its inward movement.

Within the lower part of the flexible punch member 63 is located a tapered centrally perforated member 107 rigidly connected to the member 66—68—69 by means of a plurality of struts or connecting bars 108 located between the adjacent spider arms 61. (See Fig. 5.) Located below the tapered member 107 is a second centrally perforated tapered member 109 equipped with a hollow protuberance 110 extending upwardly through the central perforation in the member 107, and also provided with a downwardly projecting hollow protuberance 111 extending through the bottom of the flexible punch member 63. The normal positions of the tapered members 107 and 109 are illustrated in Fig. 2 with one in contact with the other. The struts 108 prevent a relative rotation of the sleeve 17 and shaft 21. Normally the tubular member 110 projects slightly beyond the upper surface of the member 107 (see Figs. 2 and 4) so that when the shaft 21 is moved downwardly in relation to sleeve 17 as above described it will engage the projecting end of this tubular member 110 and consequently move the lower member 109 downwardly relative to the member 107 with a result that the lower end of the rubber punching member 63 will be expanded and thereby take up any inequalities in the molded material due to any collapsing or puckering action of the lower end of said rubber punching member which might occur during the punching operation. The upper end of the protuberance 110 is perforated and within the same is a valve stem 112 provided on its lower end with a valve 113 normally engaging a valve-seat located upon the lower end of the protuberance 111. As clearly shown in Figs. 2 and 7 the valve 113 is held upon its seat by means of a spring surrounding the valve stem. It will therefore be seen that as the punch is withdrawn from the mold air from the interior of the punch may be admitted by the valve 113 to the space between the molded article and the punch and thereby destroy the vacuum which would otherwise be created therein due to the withdrawal of said punch.

Fixed to the lower end of shaft 21 is the spider 60 which comprises the four arms 61 whose circumferential faces taper downwardly. Said arms 61 are T-shaped and lock into the grooves 114 formed by the ribs 115 on the inner surface of said jaws 62, said grooves being tapered to receive the T-shaped portions of said arms 61. Each of said jaws 62 comprises a section of a long annular band which is arcuated longitudinally or otherwise shaped to pattern the inside of a crucible and which carries at about its midpoint the longitudinal ribs 115 grooved as described above to receive the T-shaped portions of the spider arm 61. Together the several jaws 62 form in the unexpanded position of the punch a barrel shaped ring seen in vertical section in Fig. 4 and in cross-section in Fig. 5. In the back of said jaws 62 are the grooves 116, tapered substantially parallel to said grooves 114, into which fit the similarly tapered ribs 117 formed on the interior of the punch member 63. These tapering ribs 117 are to be seen in vertical section in Figs. 2 and 7 and in cross section in Figs. 9 and 10, the upper ends of which are seen in plan view in Fig. 5 where it will also be seen that the tapering grooves 116 in the backs of jaws 62 are tapered to nothing at the tops and outside edges of said jaws. These cooperating grooves and ribs 61, 114, 116 and 117 prevent rotation with the mold of said spider 60, jaws 62, and punch member 63. Said ribs 117 on the inside of punch 63 extend down to the bottom thereof and fit into corresponding grooves in members 107 and 109, which serve to prevent a circumferential rotation or distortion of the lower end of the rubber member 63 due to its frictional engagement with plastic material in the mold as the latter is rotated.

In the normal position of the parts, that is to say in the position illustrated in Fig. 1, the arcuate portions 118 and 119 of the jaws 62 are spaced slightly from the rubber punch member 63 (see Fig. 5). In other words only the ribs 117 of the member 63 are in contact with the jaws in the grooves 116 As soon as the punch, however, has been lowered into the plastic material and the said shaft 21 is moved with respect to sleeve 17, the tapering faces of ribs 61 on spider 60 cause all portions of the external faces of the jaw members 62 to come into contact with the inner surface of the flexible punch member 63.

The mechanism described above for effecting a lateral or radial expansion of the punch member 63 is specifically referred to for illustrative purposes only, and because the same has been found very satisfactory in actual practice. In many uses the punch member may be made relatively thicker at its lower end, as illustrated in Fig. 4, to compensate for the puckering of the lower end thereof. Furthermore I do not limit myself to a mechanical means for effecting the lateral expansion as this may be done by fluid pressure. In fact it is conceivable that for accurate work pneumatic or liquid means would be preferable as a more uniform expansion of all portions of the walls of the flexible member 63 could be effected.

Any suitable means may be employed for admitting air above and below the piston 22 in the cylinder 20 and also for exhausting the same therefrom. As herein illustrated this mechanism comprises an inlet 120 coupled up to a four-way valve 121 as clearly illustrated in Fig. 2. A pipe 122 connects the inlet 120 to the cylinder 20 above the piston 22 and the pipe 123 connects the inlet 120 with the cylinder 20 below the piston. The valve 121 is connected to the exhaust pipe 124. A lever 125 is employed to manipulate the valve 121. When the lever is in the position illustrated in Figs. 1 and 2 air from the inlet 120 is admitted through the pipe 122 above the piston 22. At the same time this valve 121 enables the discharge of the air below the piston through the pipe 123 to the exhaust pipe 124. When this lever is in mid-position of the sector 126, the inlet is cut off. However, when it is at the other end of the sector from that illustrated in Figs. 1 and 2, the inlet 120 is connected up with the pipe 123, thus enabling the air to be admitted below the piston and the punch raised from operative position. At the same time the pipe 122 is connected up with the exhaust pipe 124 to enable the discharge of air from above the piston.

As a preferred form I make the interior surface of the mold sections 54, 55 and 56 of a series of tangential surfaces so that a cross section would appear as a many sided polygon instead of a circle (see Figs. 11 and 12). This form is designed to prevent rotation in the mold of the plastic material by the turning of said mold by said table 25. Roughening in some cases will suffice.

In the operation of my invention the first molding operation after placing a quantity of suitable plastic material into the mold 54—55—56 is the lowering of the punch 18 not only into the rotating mold but also into the mass of plastic material previously placed therein as a result of which said plastic material is pressed against the sides of the mold as shown in Figs. 2 and 4. This pressure exerted vertically and horizontally at the same time results in the arrangement of the grains of the material of the crucible in both the vertical and horizontal directions substantially throughout it, which arrangement effects a very strong structure of said crucible.

The quantity of plastic material to be deposited in the mold can be very accurately determined either by weight or volume. The amount inserted is slightly less than that required to fill the space between the punch and the mold when the punch has been lowered to its downward limit of travel and before the latter has been expanded. (See Figs. 2 and 4). The amount inserted however, should be slightly in excess of that required to fill the space between the punch and the mold after the latter has been expanded. It will therefore be seen that when the punch 18 has been expanded the plastic material is not only compressed (thereby reducing its volume slightly) but any excess is extruded through the opening 127 located between the shoulder 128 of the member 63 and the flange 129 of the mold sections 54, 55 and 56. This opening 127, preferably annular in shape, is comparatively small thus requiring considerable pressure to effect the intrusion of the excess material. It may be stated in this connection that owing to the relatively rotational movement of the punch and mold, particularly in the final molding operation, and due to the lateral expansion and contraction of the punch member a plastic substance of a much stiffer consistency may be used with a result that the molded crucible or pot can be immediately removed from the mold and will sit alone without the slightest danger of sagging, much less collapsing.

The next operation is the expanding of the rubber punch 63 while in the mold which is secured by the movement of said spider 60 downward with respect to the jaws 62 and said punch 63, this relative movement being secured by the movement of shaft 21 in sleeve 17 after the downward movement of said sleeve has been arrested. This downward movement of the spider with that of its tapering arms 61 results in the spreading apart of said jaws 62 whereby the punch 63 is expanded and the plastic material within the mold is further compressed and spread over the surface of the mold, any excess material being extruded from the mold through the space 127 provided for that purpose and located between the upper cylindrical portion 128 of the rubber punch member and the flange 129 of the mold sections. Said space 127 is made small enough to require considerable pressure to cause the extrusion of the excess material with the result that the upper portion of the molded crucible, like the rest of it, is compacted and condensed and the fibers or grains thereof arranged in the manner above described.

This further movement of said shaft 21 results, as above described, in the downward movement of the member 109 with respect to the member 107 whereby any compression of the bottom of said punch 61 which might occur during the downward thrust into the plastic material is compensated for and the lower end of said punch expanded to the desired shape.

In the withdrawal of the punch from the mold the shaft 21 is first moved with respect to said sleeve 17 whereby said spider 60 is moved upwardly and the jaws 62 thereby retracted from pressure against the inside surface of the rubber punch 63. Air pressure is equalized between the outside of said punch 63 and its interior by means of the air duct 72 in the top of the punch mechanism. After said spider 60 has been moved back to its upper limit within the punch mechanism the sleeve 17 is moved with the shaft 21 and the whole punch mechanism raised from within the mold and is ready to be moved into a new charge of plastic material to be molded.

The axis of the mold and punch are preferably concentric. For crucibles known as No. 60 (these crucibles are about fourteen inches high and a maximum diameter of about thirteen inches) a speed of 80 R. P. M. of the mold has found to give excellent results. For smaller pots an increased number of revolutions per minute would probably be desirable and with a larger pot a lower angular speed can be employed. One of the more important advantages in rotating the mold during the molding operation is to facilitate the removal of the crucible from the mold after the operation is complete. In fact it has been found that it is otherwise very difficult to remove the crucible from the mold.

The cylindrical portion 128 of the flexible member 63 forms a fillet with the latter which cooperates with the internal flange 129 not only to provide a space 127 for the extrusion of the surplus material but also to properly form the top of the crucible. It is important that the flange 129 extends inwardly for a substantial distance, that is to say far enough to shape a major portion of the top of the crucible so as to prevent the tendency of the air pressure to tear off or distort the top of the crucible upon the withdrawal of the punch, the inner edge of said flange being located in juxtaposition in said fillet and for the purposes stated.

The mold sections 54 and 55 are pivoted to the section 56 at points located back of the radial lines which pass through the plane of the contacting edges of said sections 54 and 55 with the section 56, which enables all portions of the interior wall of said hinged sections to recede in a radial direction from the crucible molded to prevent distortion or injury to the outer wall of the latter. The pivotal points are preferably located on lines $a$—$b$ which pass through the points where the inner walls of the mold sections contact with each other.

It is to be understood that my invention is not limited to the form shown in the drawings and described in the foregoing as many changes may be made in points of detail and other embodiments resorted to without deviating from the true spirit and scope of my invention. I make no claim herein to the method as that constitutes the subject matter of a separate application filed on even date herewith, Serial No. 701,663.

What I claim is:

1. A machine for manufacturing crucibles and the like, comprising a mold into which the crucible forming material is deposited, a hollow, flexible and expansible punch movable into the mold to partially compress said material, means for expanding the punch after it has entered the mold to further compress said material, and means for effecting a relative rotation of the mold and punch as the material is being compressed.

2. A machine for manufacturing crucibles and the like, comprising a mold within which the crucible forming material is deposited, a hollow, flexible and expansible punch cooperating with the mold for compressing said material into a crucible, means for effecting a relative rotation of the punch and mold as the material is being compressed, and means for collapsing the punch after compression to enable it to be withdrawn from the mold.

3. A machine for manufacturing crucibles and the like, comprising a mold into which the crucible forming material is deposited, a punch having continuous flexible side and bottom walls movable into the mold for compressing the material into a crucible the axis of said punch being concentric with the axis of the mold, means for effecting a relative rotation of the punch and mold as the material is being compressed, and means for collapsing the punch after compression to enable it to be withdrawn from the mold.

4. A machine for manufacturing crucibles and the like, comprising a mold into which the crucible forming material is deposited, a punch having continuous flexible side and bottom walls movable into the mold for compressing said material into a crucible, means for effecting a relative lateral movement of the mold and punch walls and means for effecting a relative rotation of the punch and mold.

5. A machine for manufacturing crucibles and the like, comprising a mold into which the crucible forming material is deposited, a flexible punch movable into the mold to partially compress said material, means for expanding the punch after it has entered the mold to further compress said material, and means for effecting a relative rotation of the mold and punch as the material is being compressed, and means for collapsing the punch to enable its withdrawal from the crucible.

6. A machine for manufacturing crucibles and the like, comprising a mold within which the crucible forming material is deposited, a flexible punch movable into the mold for compressing said material into a crucible, means for effecting a relative rotation of the punch and mold as the material is being compressed, and means for collapsing the punch after compression to enable it to be withdrawn from the mold.

7. A machine for manufacturing crucibles and the like, comprising a mold into which the crucible forming material is deposited, in combination with means for compressing said material, said means including a punch having continuous flexible side and bottom walls for effecting a substantially uniform distribution of the pressure upon the entire material as it is being compressed into a crucible, and means for enabling the extrusion of surplus material from the mold.

8. A machine for manufacturing crucibles and the like, comprising a mold into which the crucible forming material is deposited, in combination with a punch having continuous flexible side and bottom walls for effecting a substantially uniform distribution of pressure upon the entire material as it is being compressed into a crucible, and means for enabling the extrusion of surplus material from the mold.

9. A machine for manufacturing crucibles and the like, comprising a mold into which the crucible forming material is deposited, in combination with a punch for effecting a substantially uniform distribution of pressure upon the entire material as it is being compressed into a crucible, and means on said punch cooperating with means on said mold for enabling the extrusion of surplus material.

10. A machine for manufacturing crucibles and the like, comprising in combination, a mold into which the crucible forming material is deposited, a punch having continuous flexible side and bottom walls for said mold and said plastic material, means for moving said punch into said mold, and means for expanding said punch radially after said movement into said mold to press said plastic material against the surface of said mold.

11. In a machine for manufacturing crucibles and the like, in combination with a mold, and means for rotating said mold axially, of a punch for said mold and plastic material comprising an outer radially expansible member and inner expanding means, means for moving said punch into said mold and said plastic material, and means for thereafter actuating said expansible member.

12. In a machine for manufacturing crucibles and the like, a mold and means for rotating said mold axially, in combination with a punch for said mold and plastic material comprising an outer radially expansible member and inner expanding means, means for moving said punch into said mold to partially compress said plastic material, and means for thereafter actuating said expansible member to complete the compression of said material, and means for contracting said expansible member to enable the punch to be removed from the mold.

13. In a machine for manufacturing crucibles and the like, a mold, and means for rotating said mold axially, in combination with an expansible punch mounted axially above said mold comprising an outer flexible member and an inner expansible member, means for moving said punch into said mold comprising a shaft mounted axially above said mold and slidable within an outer sleeve, said sleeve being fixed to said outer flexible member and said shaft being connected to said inner expansible member.

14. In a machine for manufacturing crucibles and the like, a mold, and means for rotating said mold axially, in combination with an expansible punch mounted axially above said mold comprising an outer flexible member and an inner expansible member, means for moving said punch into said mold comprising a shaft mounted axially above said mold and slidable within an outer sleeve, said sleeve being fixed to said outer flexible member and said shaft being connected to said inner expansible member, and means for moving said punch into said mold and for moving said inner expansible member with respect to said outer flexible member.

15. In a plastic material molding machine, in combination, a mold, a revolving table for said mold a frame work over said table supporting a bearing over the center of rotation of said table, a sleeve extending through and slidable vertically in said bearing, a hollow punch of heavy expansible rubber mounted on the lower end of said sleeve and coaxial therewith, a shaft in said sleeve slidable therewith and therein and terminating within said punch, an expanding member mounted on said shaft within said punch comprising radial arms tapering downwardly in planes along the axis of said shaft and having undercut sides, a jaw for each of said arms having tapering and undercut grooves on their inner sides corresponding to and fitting on said arms, said jaws forming together in the unexpanded position an annular ring conforming to the inner surface of said punch, an annular member below said expanding member fitting the sides of said punch, and a bottom member having an axial extension through and terminating above said annular member in the unexpanded position and having a check valve in an axial opening therethrough connecting the interior of the punch to the exterior thereof through its bottom, an air conduit from the interior of said punch to the exterior through its top, and ribs on the interior of said expansible member extending downwardly through corresponding grooves in said jaws, annular member, and bottom member.

16. In a plastic material molding machine, in combination a mold, a revolving table for said mold, a frame work over said table supporting a bearing over the center of rotation of said table, a sleeve extending through and slidable vertically in said bearing, a hollow punch of heavy expansible rubber mounted on the lower end of said sleeve and coaxial therewith, a shaft in said sleeve slidable therewith and therein and terminating within said punch, an expanding member mounted on said shaft within said punch comprising radial arms tapering downwardly in planes along the axis of said shaft and having undercut sides, a jaw for each of said arms having tapering and undercut grooves on their inner sides corresponding to and fitting on said arms, said jaws forming together in the unexpanded position an annular ring conforming in the inner surface of said punch, an annular member below said expanding member fitting the sides of said punch, and a bottom member having an axial extension upwardly through and terminating above said annular member in the unexpanded position and having a check valve in an axial opening therethrough connecting the interior of the punch to the exterior thereof through its bottom, an air conduit from the interior of said punch to the exterior through its top, and ribs on the interior of said expansible member extending downwardly through corresponding grooves in said jaws, annular member, and bottom member, means for moving said sleeve and shaft downwardly to position said punch in said mold, means for arresting said movement of said sleeve and allowing said shaft to continue moving for a predetermined distance, and means for retracting said shaft substantially through said predetermined distance and then moving it with said sleeve to remove said punch from said mold.

17. A machine for manufacturing crucibles and the like, comprising a punch element having continuous flexible side and bottom walls for forming the interior surface of the crucible, and a molding element for forming the exterior surface of said crucible, in combination with means for effecting a relative longitudinal movement of said elements towards each other to partially form the crucible, and means for effecting thereafter a relative lateral movement of said elements towards each other to further compress the material to complete the crucible.

18. A machine for manufacturing crucibles and the like, comprising a flexible punch element for forming the interior surface of the crucible, a molding element for forming the exterior surface of said crucible, means for effecting a relative movement of said elements towards each other to compress said material into a crucible, and means for effecting a relative rotation of said elements as the material is being pressed.

19. A machine for manufacturing crucibles and the like, comprising a rotable chuck, a sectional mold adapted to be clamped in position by said chuck to rotate therewith, and means on said chuck cooperating with means on said mold to prevent longitudinal movement of one with respect to the other.

20. In a machine for manufacturing crucibles and the like, a rotating chuck comprising two sections one of which is fixed and the other of which is movable to open and close the chuck, a mold adapted to be clamped in position by said chuck and having means thereon engaging with means on said chuck to prevent relative longitudinal movement of said mold and chuck.

21. In a machine for manufacturing crucibles and the like, a chuck comprising two sections one of which is fixed and the other of which is movable to open and close the chuck, a sectional mold adapted to be clamped in position by said chuck, means cooperating with said mold for compressing crucible forming material therein, and means for effecting a relative rotation of the mold and the aforesaid means as the material is being compressed.

22. In a machine for manufacturing crucibles and the like, a rotating table, a chuck comprising two sections one of which is secured to said table and the other of which is movable to open and close the chuck, a sectional mold adapted to be clamped in position between the two sections of the chuck, and means cooperating with said mold for compressing crucible forming material therein.

23. A machine for manufacturing crucibles and the like, comprising a mold into which the crucible forming material is deposited and provided with an internal flange at the upper edge thereof, a punch movable into the mold and provided with a fillet on the exterior surface thereof adapted to cooperate with said flange to form the upper edge or top of the crucible.

24. A machine for manufacturing crucibles and the like, comprising a mold into which the crucible forming material is deposited, a punch movable into the mold, and means for preventing the air pressure from tearing off or distorting the top of the crucible upon the withdrawal of the punch comprising a fillet on said punch, and a flange on said mold extending a substantial distance inwardly into juxtaposition to said fillet.

25. A mold for molding crucibles and the like comprising a plurality of sections hinged to one another about points which enable all portions of the interior walls of said hinged section or sections to recede in a radial direction from the crucible molded to prevent distortion or injury to the outer wall of the latter.

26. A machine for manufacturing crucibles and the like, comprising a mold into which the crucible forming material is deposited, a hollow, flexible and expansible punch movable into the mold to partially compress the material, means for expanding the punch after it has entered the mold, and means for imparting a relative rotation of the mold and punch as the latter is being expanded to effect a substantially uniform pressure over the whole of the plastic material and thereby compact the material and conform it to the shape of the mold.

In testimony whereof, I have hereunto set my hand this 13th day of March, 1924.

HAROLD E. PORTER.